United States Patent [19]
Hollins

[11] 3,980,066
[45] Sept. 14, 1976

[54] FUEL INJECTION PUMPING APPARATUS

[75] Inventor: William John Hollins, London, England

[73] Assignee: C.A.V. Limited, Birmingham, England

[22] Filed: Mar. 25, 1975

[21] Appl. No.: 561,854

[30] Foreign Application Priority Data
Apr. 2, 1974 United Kingdom............... 14484/74

[52] U.S. Cl............................................ 123/140 R
[51] Int. Cl.² ....................... F02D 1/04; F02D 1/06
[58] Field of Search ................................ 123/140 R

[56] References Cited
UNITED STATES PATENTS
2,317,022  4/1943  Benjamin ....................... 123/140 R
3,791,361  2/1974  Hofmann ....................... 123/140 R Primary Examiner—Charles J. Myhre
Assistant Examiner—Ronald B. Cox

[57] ABSTRACT

A fuel injection pumping apparatus includes a pump the amount of fuel supplied by which is controlled by a control member. The apparatus also includes a governor mechanism comprising first and second sleeves movable axially each sleeve being loaded by a respective spring. The sleeves are movable against the action of the springs by means of a governor weight mechanism including weights and lever means is provided to interconnect the sleeves with the control member. The lever means includes a lever which is pivotally mounted and which has one end coupled to the first sleeve, the lever supporting an angularly movable rod which is coupled to the second sleeve. The rod mounts a member in which is defined a slot the slot accommodating a peg secured to the control member whereby relative axial movement of the sleeves will impart angular movement to the rod which in turn will impart a small movement to the control member, substantial movement of the control member occurring during movement of the sleeve against the action of its spring.

7 Claims, 3 Drawing Figures

FUEL INJECTION PUMPING APPARATUS

This invention relates to fuel injection pumping apparatus for supplying fuel to internal combustion engines and of the kind comprising a rotary shaft adapted to be driven in timed relationship with an associated engine, an injection pump driven by the shaft, a control member movable to vary the quantity of fuel supplied by the injection pump, and lever means coupling the control member to a governor mechanism including a centrifugally operable weight mechanism driven by the shaft.

The object of the invention is to provide such an apparatus in a simple and convenient form.

According to the invention, in an apparatus of the kind specified, said governor mechanism comprises a first sleeve slidable on the shaft, first resilient means acting on the first sleeve to urge the sleeve in one direction, a second sleeve slidable on the shaft, second resilient means acting on said second sleeve, said weight mechanism acting to effect movement of the sleeves in opposition to the force exerted by said resilient means, said lever means comprising a first element constrained for pivotal movement about an axis, said first element being coupled to said first sleeve, a second element coupled to said second sleeve and being mounted relative to said first element so as to pivot therewith about said axis, and means coupling said second element to the control member whereby limited movement of the control member will occur as a result of movement of the sleeves relative to each other, the main movement of the control member occurring as a result of movement of the first sleeve.

Examples of apparatus in accordance with the invention will now be described with reference to the accompanying drawings, in which.

Figure 1:
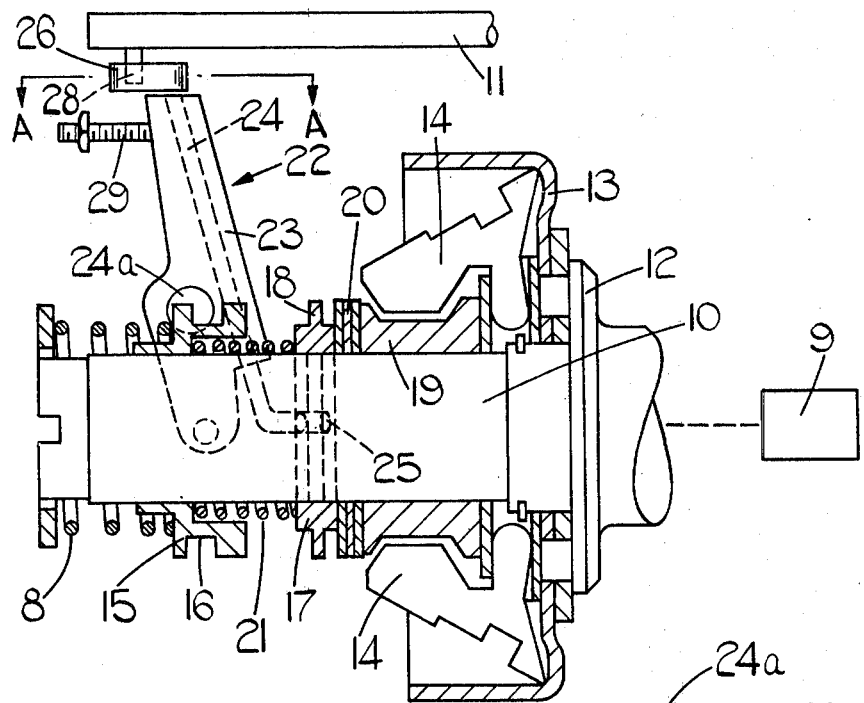
FIG. 1 shows a sectional side elevation through a portion of an apparatus.
Figure 2:
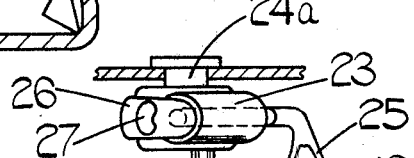
FIG. 2 is a sectional plan view on the line A—A of FIG. 1.

With reference to FIGS. 1 and 2 of the accompanying drawings, the apparatus includes a drive shaft 10 and the portion shown is an extension of the main shaft of the pumping apparatus. At other positions, the drive shaft is provided with a plurality of cams which are associated with individual injection pumps 9 respectively, and which upon rotation of the drive shaft in timed relationship with an associated engine, supply fuel to the combustion spaces of the engine at appropriate instants in time. The apparatus also includes a control rod 11 which is axially movable to adjust the amount of fuel supplied by the injection pumps to the associated engine. In the arrangement which is shown in the drawings, movement of the control rod towards the left increases the amount of fuel supplied by the injection pumps.

The shaft 10 is provided with a flange 12 upon which is mounted a cup shaped member 13 which is shaped to define a cage for a plurality of governor weights 14. Also mounted on the shaft 10 is a first sleeve 15 in the periphery of which is formed a circumferential groove 16. The sleeve is axially movable on the shaft, and engaging the end of the sleeve remote from the flange 12 is a spring shown as a coiled spring 8 but in practice a leaf spring. In practice the force exerted by the leaf spring is adjustable in known manner by means of a roller assembly which engages the spring intermediate its ends and also engages an inclined ramp which is located within the housing which encloses the mechanism. The roller assembly is connected to an operator adjustable member whereby the force exerted on the sleeve 15 by the spring can be adjusted.

Also provided on the shaft is a second axially slidable sleeve 17 and this is provided with a circumferentially extending rib 18, the sleeve 17 is positioned adjacent a further sleeve 19 and interposed between these two sleeves is a thrust bearing assembly 20. The sleeve 19 is movable axially upon outward movement of the weights 14, away from the flange 12. Such movement is also imparted to the sleeve 17, and interposed between the sleeves 15 and 17 is a coiled compression spring 21. Moreover, the extent of compression of the coiled compression spring 21 is limited by abutment of the two sleeves. The spring 21 is a relatively light spring as compared with the aforementioned leaf spring.

Also provided is a lever means generally indicated at 22. The lever means includes a first element in the form of a lever 23 which is pivotally mounted about an axis defined by a pivot pin 24a which is shown in FIG. 2 and which is secured to the housing. One end of the lever 23 is provided with a peg which engages within the circumferential groove 16 formed in the sleeve 15, and the other end of the lever 23 terminates adjacent the control rod 11. The other element comprises a rod 24 which is angularly movable within a longitudinal bore in the lever 23. At its lower end, the rod 24 is provided with a fork arrangement 25 which engages with the rib 18 on the sleeve 17. The arrangement is such that as the two sleeves move relative to each other as for instance, when the spring 21 is compressed or extends, angular movement will be imparted to the rod 24.

At its upper end, the rod 24 mounts a block 26 which is disposed beneath the control rod. In the surface of the block 26 which is presented to the control rod, there is formed a cam profile defined by a kidney shaped slot 27, and located within this slot is a follower 28 which is secured to the control rod. The slot 27 is offset from the axis of angular movement of the rod 24, and as the sleeve 17 is moved towards the sleeve 15 with the latter held, limited movement of the control rod will occur. Moreover, as the sleeve 15 moves on the shaft, the lever 23 will pivot and more extensive movement of the control rod will occur.

In operation, for a given setting of the operator adjustable member, as the speed of operation of the pump increases, the weights 14 will move outwardly and effect axial movement of the sleeve 19. Such movement will initially cause compression of the spring 21 so that the sleeves 15 and 17 will move relative to each other. This has the effect as described and limited movement of the control rod 11 occurs. When the sleeves 15 and 17 abut, pivotal movement of the lever 23 against the action of the leaf spring will occur, and such movement will cause movement of the control rod 11 about said axis in a direction to reduce the amount of fuel supplied to the engine. Thus, a normal governing action is established. The relative movement of the sleeves 15 and 17 and the resulting limited movement of the control rod 11 shapes the initial portion of the fuel delivery curve of the pump at low engine speeds. As will be seen in FIG. 1 there is shown a maximum fuel stop 29 which limits the extent of movement of the element 23 and thereby the control rod 11.

Figure 3:
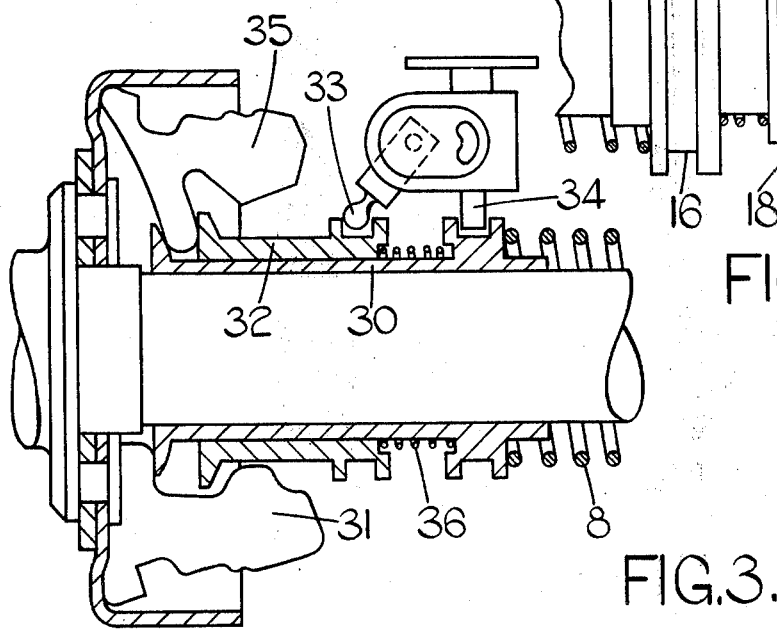
FIG. 3 shows an alternative arrangement.

In the arrangement shown in FIG. 3, the equivalent of the sleeve 15 is indicated at 30, and this is acted upon by a plurality of weights 31. Moreover, slidable on the sleeve 30 is a further sleeve 32 which is the equivalent of the sleeve 17. The sleeve 32 is coupled to the rod 24 by means of an arm 33, the element 23 being coupled to the sleeve 30 by means of a pin 34. Moreover, the sleeve 32 is movable by means of weights 35. A spring 36 is provided intermediate the sleeves as in the previous example.

As in the previous example, relative movement of the sleeves will effect angular movement of the rod 24.

The mass and number of the weights 35 can be chosen to provide the desired governing characteristics at low engine speeds. Moreover, since the spring 36 does not transmit the force exerted by the weights 31, it can be of lighter construction.

I claim:

1. A fuel injection pumping apparatus for supplying fuel to internal combustion engines and comprising a rotary shaft adapted to be driven in timed relationship with an associated engine, an injection pump driven by the shaft, a control member movable to vary the quantity of fuel supplied by the injection pump, and lever means coupling the control member to a governor mechanism including a centrifugally operable weight mechanism driven by the shaft, said governor mechanism comprising a first sleeve slidable on the shaft, first resilient means acting on the first sleeve to urge the sleeve in one direction, a second sleeve slidable on the shaft, second resilient means acting on said second sleeve, said weight mechanism acting to effect movement of the sleeves in opposition to the force exerted by said resilient means, said lever means comprising a first element constrained for pivotal movement about an axis, said first element being coupled to said first sleeve, a second element coupled to said second sleeve and being mounted relative to said first element so as to pivot therewith about said axis, and means coupling said second element to the control member whereby limited movement of the control member will occur as a result of movement of the sleeves relative to each other, the main movement of the control member occurring as a result of movement of the first sleeve.

2. An apparatus as claimed in claim 1 in which said second resilient means is interposed between the sleeves, the extent of movement of the two sleeves towards each other being limited by abutment of the sleeves.

3. An apparatus as claimed in claim 2 in which the force exerted by said first resilient means is adjustable, said second resilient means being constituted by a relatively light spring as compared with the spring constituting said first resilient means.

4. An apparatus as claimed in claim 3 in which said weight mechanism operates only on said second sleeve.

5. An apparatus as claimed in claim 3 in which said weight mechanism comprises first and second centrifugal weights, said first weight acting on said first sleeve to move the sleeve against the action of the first resilient means, said second weight acting on said second sleeve.

6. An apparatus as claimed in claim 1 in which said first element comprises a pivotal lever having one end coupled to said first sleeve so that axial movement of the sleeve will impart angular movement to the lever, said second element comprising a rod angularly movable within a bore defined in the lever, said rod having a connection with said first sleeve whereby angular movement will be imparted to the rod as the sleeves move relative to each other, the rod extending to adjacent the control member and mounting a member having a cam profile, said cam profile being engaged by a follower secured to the control member, the cam profile being offset relative to the axis of the rod whereby angular movement of the rod will impart axial movement to the control member.

7. An apparatus as claimed in claim 6 including a stop to limit the extent of movement of the control member in the direction of increased fuel supply.

* * * * *